(12) United States Patent
Landerer et al.

(10) Patent No.: US 10,644,366 B2
(45) Date of Patent: May 5, 2020

(54) METHOD FOR PRODUCING AN ASSEMBLY FROM AN ENERGY STORAGE MODULE, AND A COOLING ELEMENT AND ASSEMBLY

(71) Applicant: Bayerische Motoren Werke Aktiengesellschaft, Munich (DE)

(72) Inventors: Florian Landerer, Grafing (DE); Sebastian Siering, Munich (DE); Fabian Burkart, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/208,983

(22) Filed: Jul. 13, 2016

(65) Prior Publication Data

US 2016/0322679 A1 Nov. 3, 2016

Related U.S. Application Data

(63) Continuation of application No. PCT/EP2015/052924, filed on Feb. 12, 2015.

(30) Foreign Application Priority Data

Feb. 28, 2014 (DE) .......... 10 2014 203 765

(51) Int. Cl.
*H01M 10/625* (2014.01)
*H01M 10/613* (2014.01)
(Continued)

(52) U.S. Cl.
CPC ....... *H01M 10/625* (2015.04); *H01M 2/1077* (2013.01); *H01M 2/1083* (2013.01);
(Continued)

(58) Field of Classification Search
None
See application file for complete search history.

(56) References Cited

U.S. PATENT DOCUMENTS

2009/0253026 A1* 10/2009 Gaben ............... B60R 16/04
429/56
2012/0298433 A1* 11/2012 Ohkura ............. H01M 2/1077
180/65.1
(Continued)

FOREIGN PATENT DOCUMENTS

CN 103563164 A 2/2014
DE 10 2010 005 154 A1 7/2011
(Continued)

OTHER PUBLICATIONS

Machine translation of DE 102010005154 A1 printed Apr. 1, 2018 (Year: 2018).*

(Continued)

*Primary Examiner* — Maria Laois
(74) *Attorney, Agent, or Firm* — Crowell & Moring LLP

(57) ABSTRACT

A method is provided for producing an assembly for an energy supply system, having an energy storage module and a plate-shaped cooling element. Between a contact side of the energy storage module and a contact side of the cooling element, a deformable, adhesive heat conducting layer is applied. Subsequently, the energy storage module and the cooling element are pressed together, wherein by way of the heat conducting layer, a dimensionally stable adhesive connection between the energy storage module and the cooling element is produced, which permanently connects the energy storage module to the cooling element. By way of the adhesive connection, the contact side of the energy storage module is bonded with the contact side of the cooling element in a planar, material-fit, durable, and dimensionally (Continued)

stable manner such that the energy storage module and the cooling element form a structural unit.

6 Claims, 3 Drawing Sheets

(51) Int. Cl.
| | | |
|---|---|---|
| *H01M 10/653* | (2014.01) | |
| *H01M 10/655* | (2014.01) | |
| *H01M 10/6554* | (2014.01) | |
| *H01M 10/6551* | (2014.01) | |
| *H01M 10/6556* | (2014.01) | |
| *H01M 2/10* | (2006.01) | |

(52) U.S. Cl.
CPC ....... *H01M 2/1094* (2013.01); *H01M 10/613* (2015.04); *H01M 10/653* (2015.04); *H01M 10/655* (2015.04); *H01M 10/6551* (2015.04); *H01M 10/6554* (2015.04); *H01M 10/6556* (2015.04); *H01M 2220/20* (2013.01)

(56) References Cited

U.S. PATENT DOCUMENTS

| | | | | |
|---|---|---|---|---|
| 2014/0093766 | A1* | 4/2014 | Fees | H01M 10/049 |
| | | | | 429/120 |
| 2015/0140388 | A1* | 5/2015 | Harada | H01M 10/617 |
| | | | | 429/120 |
| 2016/0322679 | A1 | 11/2016 | Landerer et al. | |

FOREIGN PATENT DOCUMENTS

| | | | | |
|---|---|---|---|---|
| DE | 102010005154 A1 * | 7/2011 | | H01G 9/0003 |
| DE | 10 2011 104 433 A1 | 7/2012 | | |
| DE | 10 2011 102 765 A1 | 11/2012 | | |
| DE | 10 2011 109 934 A1 | 2/2013 | | |
| DE | 10 2011 084 536 A1 | 4/2013 | | |
| DE | 10 2012 205 750 A1 | 10/2013 | | |
| EP | 2 511 922 A1 | 10/2012 | | |
| WO | WO-2012163484 A1 * | 12/2012 | ......... | H01M 10/049 |
| WO | WO-2013171885 A1 * | 11/2013 | | |
| WO | WO 2015/128194 A1 | 9/2015 | | |

OTHER PUBLICATIONS

Chinese-language Office Action issued in counterpart Chinese Application No. 201580003006.7 dated Nov. 1, 2017 with English translation (Fourteen (14) pages).

International Search Report (PCT/ISA/210) issued in PCT Application No. PCT/EP2015/052924 dated Apr. 29, 2015 with English translation (seven pages).

German-language Written Opinion (PCT/ISA/237) issued in PCT Application No. PCT/EP2015/052924 dated Apr. 29, 2015 (five pages).

German Search Report issued in German Patent Application No. 10 2014 203 765.4 dated Oct. 16, 2014 with partial English translation (13 pages).

German-language European Office Action issued in counterpart European Application No. 15705954.4 dated Oct. 5, 2017 (Five (5) pages).

Chinese-language Office Action issued in counterpart Chinese Application No. 201580003006.7 dated Jul. 30, 2018 with English translation (13 pages).

English translation of Chinese-language Office Action issued in counterpart Chinese Application No. 201580003006.7 dated Apr. 3, 2019 (six (6) pages).

Chinese-language Office Action issued in counterpart Chinese Application No. 201580003006.7 dated Aug. 23, 2019 with English translation (13 pages).

* cited by examiner

METHOD FOR PRODUCING AN ASSEMBLY FROM AN ENERGY STORAGE MODULE, AND A COOLING ELEMENT AND ASSEMBLY

CROSS REFERENCE TO RELATED APPLICATIONS

This application is a continuation of PCT International Application No. PCT/EP2015/052924, filed Feb. 12, 2015, which claims priority under 35 U.S.C. § 119 from German Patent Application No. 10 2014 203 765.4, filed Feb. 28, 2014, the entire disclosures of which are herein expressly incorporated by reference.

BACKGROUND AND SUMMARY OF THE INVENTION

The invention relates to a method for producing an assembly for an energy storage system and to an assembly of this type.

In the case of electrically operated vehicles, use is made of energy storage modules which each contain a plurality of individual battery cells combined to form a stack of battery cells. The stacks of battery cells are customarily braced in the manufacturing process by an encircling frame and retained in shape by the latter. The frame also serves for fastening the energy storage module to a housing or in a vehicle.

In order not to exceed a maximum operating temperature, a cooling apparatus is required, wherein use is frequently made of plate-like cooling elements through which a cooling fluid flows. It is known to combine one such cooling element in each case with an energy storage module to form an assembly. In order to transfer a sufficient amount of heat from the energy storage module to the cooling element, the energy storage module and the cooling element are pressed against each other in order to keep the contact surfaces in contact over as large an area as possible and thus to improve the transmission of heat. Air gaps between the energy storage module and the cooling element and unevennesses in the contact surfaces have a negative effect here on the transmission of heat.

In order to improve the transmission of heat, DE 10 2010 038 681 A1 describes arranging an elastic heat-conducting coating in the form of a film or an adhesive between the base of the energy storage module and a cooling arrangement in thermal contact with the latter. The coating compensates for unevennesses in the mutually adjacent components. The force necessary for the mutual pressing together is applied by spring elements which are arranged on a base of the cooling arrangement and which permanently produce a pressing force between the cooling arrangement and the energy storage module.

In the case of the known systems, tolerances can be compensated for only by deforming the individual components under the action of a pressing force which is as high as possible. The clamping means which are used and which hold the energy storage module and the cooling element together have to be of correspondingly stiff design and have to have a high degree of stability in order to be able to permanently apply the necessary high clamping forces.

It is an object of the invention to simplify the production of a unit consisting of energy storage module and cooling element and to design the resulting assembly to be more compact and more cost-effective.

This and other objects are achieved according to the invention by a method for producing an assembly for an energy supply system, wherein the assembly has an energy storage module and a plate-shaped cooling element. A deformable and adhesive heat-conducting layer is applied between a contact side of the energy storage module and a contact side of the cooling element. The energy storage module and the cooling element are subsequently pressed together, wherein the heat-conducting layer is used to produce a dimensionally stable adhesive connection between the energy storage module and the cooling element, which permanently connects the energy storage module to the cooling element. The adhesive connection here is so robust and dimensionally stable that no further measures have to be provided in order to connect the energy storage module and the cooling element to each other thermally and structurally mechanically permanently, i.e. over the service life of the assembly.

In a possible variant, the heat-conducting layer which is still deformable and adhesive during the pressing preferably hardens to form a dimensionally stable adhesive connection.

The energy storage module and the cooling element merely have to be pressed together until the adhesive connection has sufficiently hardened in order, for example, to be able to move the assembly. Additional mounting steps, for example inserting, centering and permanently holding down the individual components, are thereby also eliminated.

The cooling element is preferably a rigid, self-supporting cooling plate in which cooling ducts, in which a cooling fluid can flow, are provided. The cooling fluid may be a coolant or a refrigerant, depending on the cooling circuit used.

Since the adhesive connection between energy storage module and cooling element is designed to be dimensionally stable and self-supporting, an additional stiff, load-bearing clamping frame around the assembly can be dispensed with. For the further mounting, for example in a structure with further energy storage modules or in a vehicle, use may be made of the frame which is normally already present and with which the individual cells of the energy storage module are braced.

Preferably, an assembly consisting of an energy storage module and a cooling element is, in each case, installed in a mounting frame, said assemblies simply being exchangeable as a unit if the cooling element or the energy storage module is defective.

During the pressing, the energy storage module and the cooling element are pressed against each other with a predetermined pressing force for a predetermined pressing time, wherein it may suffice if the weight of the energy storage module acts on the deformable adhesive heat-conducting layer. However, use may also be made of suitable higher pressing forces, for example in order to improve the distribution of the adhesive or if adhesives which deploy their effect at a predetermined pressing force are used.

The deformable adhesive heat-conducting layer is preferably applied over the entire contact surfaces between energy storage module and cooling element in order to obtain a continuous, flat, heat-conducting connection which permits a uniform, high transmission of heat on the entire contact surface.

During the pressing, the heat-conducting layer compensates for surface unevennesses and fills the space between the contact side of the cooling element and the contact side of the energy storage module completely and without air gaps as far as possible such that heat can be uniformly transmitted over the entire contact surface between the energy storage module and the cooling element.

In a preferred embodiment, the heat-conducting layer contains a heat-conducting adhesive. The latter is intended to combine the properties therein of being deformable, adhesive, insulating against high voltage and readily heat-conducting. In addition, the heat-conducting adhesive is intended to be hardening in a dimensionally stable and load-bearing manner.

Instead of a heat-conducting adhesive, use can also be made of a heat-conducting casting compound. These terms are used synonymously here. The heat-conducting adhesive or the heat-conducting casting compound is preferably sufficiently fluid in order to flow around the manufacturing-induced unevennesses or tolerances on the contact sides of the energy storage module and of the cooling element. The heat-conducting casting compound can thus, for example, also creep into manufacturing-induced rounded portions or radii at the corners of the battery cells on the contact side of the energy storage module and can compensate for same. It is therefore also no longer necessary to design the contact side of the cooling element to be as flat as possible since production-induced unevennesses can be simply compensated for by the heat-conducting layer.

During the pressing, the reduction in the thickness of the heat-conducting layer is preferably limited, and therefore, after the pressing, the adhesive connection has at least one further second predetermined thickness. It is frequently advantageous to ensure for this purpose that, over the entire contact surface between energy storage module and cooling element, the surfaces of the two contacts do not come into direct contact with each other, but rather the entire transfer of heat always takes place via the adhesive connection in order to avoid local hot or cold zones and to prevent damage.

It is also possible, for example, to compensate for unevennesses in the contact sides of the energy storage module and/or the cooling element via the heat-conducting layer by first of all a layer of the heat-conducting adhesive being applied and preferably smoothed, said layer then being entirely or partially hardened before pressing.

In order to avoid air locks, the heat-conducting layer can be applied in paths and/or in a predetermined pattern, for example in a pattern of dots, stripes or zigzags, the pattern being configured in such a manner that, when the energy storage module and the cooling element are pressed onto each other, air is automatically pressed outward and therefore an adhesive connection is produced without air locks.

In a manner governed by the concept, the individual battery cells of the energy storage module are generally aligned via the electric connection terminal arranged along one side. By this means, the heat removal zone located on the opposite side of the respective battery cell is subject to tolerances which may provide for the contact side of the energy storage module not to be completely flat since the individual battery cells of the energy storage module are offset in relation to one another on this side because of the component tolerances. These and other component-induced tolerances should be able to be compensated for via the layer thickness of the applied deformable, adhesive and heat-conducting layer.

The thickness of the heat-conducting layer and of the adhesive connection can be selected to be of such a size that the adhesive connection also supplies high-voltage protection between the energy storage module and the cooling element if such protection is required as a consequence of the design of the battery cells and of the energy storage modules or the interconnection of the energy storage modules. The high-voltage protection can be entirely achieved here via a suitable heat-conducting adhesive or a suitable heat-conducting casting compound.

However, it is also possible to arrange a high-voltage protective film, in particular composed of a suitable plastic, for example PET, between the energy storage module and the cooling element.

The high-voltage protective film may also be part of the deformable and adhesive heat-conducting layer and may be used for producing the adhesive connection when the latter is designed to be adhesive on one side or two sides. When a high-voltage protective film which is adhesive on two sides is used, it is optionally possible entirely to omit an additional heat-conducting adhesive and to realize the heat-conducting layer exclusively via the high-voltage protective film. A previous alignment of the cells of the energy storage module on the heat-removing zone of the cells is advantageous here because of the low tolerance-compensating capability of the high-voltage film. High-voltage protective films which are adhesive on one side are preferably used together with a layer of a heat-conducting adhesive.

In a preferred variant of the method, a high-voltage protective film is applied to the contact side of the energy storage module or of the cooling element. A heat-conducting adhesive is applied to the high-voltage protective film, to the cooling element and/or to the energy storage module. The energy storage module is subsequently pressed together with the cooling element before the heat-conducting adhesive hardens, in order to produce the adhesive connection. When a high-voltage protective film which is adhesive on one side is used, the respective surface facing the adhesive side of the high-voltage film is intended to remain free from heat-conducting adhesive.

The contact side of the cooling element and/or of the energy storage module is preferably cleaned beforehand in order to remove dirt particles, to improve the adhesion and thereby to prevent possible air locks.

After the high-voltage protective film has been adhesively bonded on, it is advantageous to clean and/or to activate the surface thereof in order to reduce air locks and to produce a better connection to the heat-conducting adhesive. The cleaning takes place, for example, with cleaning agents or solvents which remove contaminations of a chemical and mechanical type. For the activation, it is possible, for example, to perform a plasma treatment which improves the adhesion of an adhesive. Cleaning is also obtained here at the same time. The activation is preferably carried out after the film is adhesively bonded on and before the heat-conducting adhesive is applied to the film.

In order to position cooling element and energy storage module as accurately as possible in order to produce the adhesive connection, the cooling element can be placed into a pressing apparatus and fixed therein in a predetermined position via a positioning device. The positioning device can have, in particular, a supporting surface which corresponds to a negative shape of that surface of the cooling element which rests thereon. This is advantageous especially if that surface of the cooling element which lies opposite the contact side has, for example, a pattern of ribs for stiffening purposes, or if flow ducts are defined there in the interior of the cooling element such that said surface of the cooling element is not flat. By means of the provision of a negative to the geometry of the surface of the cooling element, the contact surface between centering apparatus and cooling element is maximized, and therefore forces are distributed uniformly during the pressing and inadvertent deformation of the cooling element is counteracted.

A positioning device is preferably also provided for the energy storage module, via which the latter is brought into the desired position thereof with respect to the cooling element. After the heat-conducting layer has been applied, the cooling element has been positioned and the energy storage module has been positioned, the pressing then takes place in order to produce the adhesive connection.

The object of the invention is also achieved by an assembly having an energy storage module and a plate-shaped cooling element, which assembly can be produced according to one of the above-described methods. A contact side of the energy storage module is bonded in a flat, integrally bonded, permanent and dimensionally stable manner to a contact side of the cooling element such that the energy storage module and the cooling element form a structural unit. Further clamping forces for optimizing the transfer of heat between said two components, as described above, are not required.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
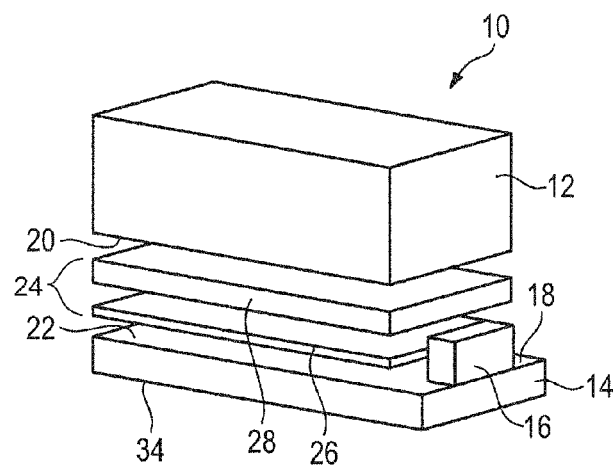
FIG. 1 is a schematic illustration of an assembly according to an embodiment of the invention which is adhesively bonded in a method according to the invention.

FIG. 1 shows an assembly 10 with an energy storage module 12 and a cooling element 14.

The energy storage module 12 is composed of a plurality of individual battery cells (not illustrated specifically here) which are interconnected electrically.

The cooling element 14 here is a rectangular cooling plate, in the interior of which are formed ducts (not shown) through which a suitable cooling fluid can flow. In this example, a fluid coupling flange 16 is arranged on the upper side 18 of the cooling element 14 at an end side. The fluid coupling flange 16 permits a fluid connection to the cooling ducts of the cooling element 14 and a flow connection with cooling elements of adjacent assemblies when the assembly 10 is installed in an overall energy store consisting of a plurality of assemblies 10 or in a vehicle.

The housing part of the energy storage module 12 that faces the cooling element 14 is composed here of a readily heat-conducting material, for example of aluminum.

The cooling element 14 functions to remove waste heat arising in the energy storage module 12. For this purpose, the energy storage module 12 is connected to the cooling element 14 in such a manner that an extensive and uniform transfer of heat occurs between a contact side 20 of the energy storage module 12 and a contact side 22 on the upper side of the cooling element 14.

For this purpose, a heat-conducting layer 24 consisting of an adhesive and readily heat-conducting material is applied between the contact sides 20, 22. In addition, the heat-conducting layer 24 is stable in terms of voltage, and therefore the heat-conducting layer supplies high-voltage protection and high-voltage insulation of the energy storage module 12 in relation to the cooling element 14. In addition, in this example, the heat-conducting layer 24 has a flat design and covers the entire contact side 20 of the energy storage module 12.

Figure 2:
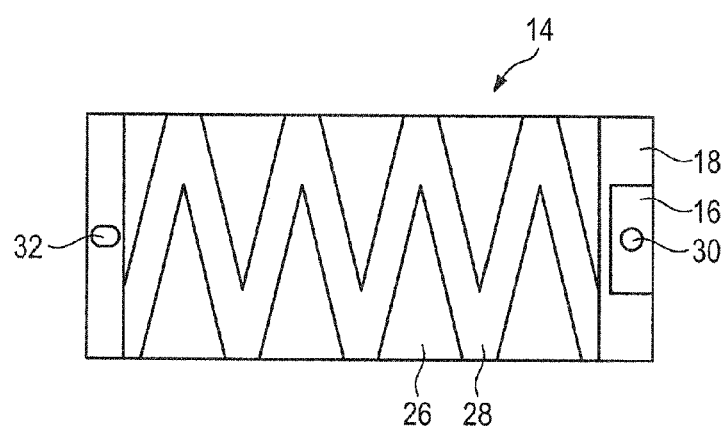
FIG. 2 is a schematic top view of a cooling element of an assembly according to an embodiment of the invention with an exemplary pattern of a heat-conducting layer before the adhesive bonding or pressing.

In the example illustrated in FIGS. 1 and 2, the heat-conducting layer 24 is composed of a continuous high-voltage protective film 26 and a continuous layer 28 of a heat-conducting adhesive or a heat-conducting casting compound.

The terms "heat-conducting adhesive" and "heat-conducting casting compound" are used synonymously here for materials which can be applied in a paste state, in which the material is deformable and has an adhesive action, and which solidify after a hardening process to form a dimensionally stable, substantially rigid compound which securely fastens two components to be adhesive bonded to each other, wherein good heat-conducting capability is provided in the hardened state.

The high-voltage protective film 26 is composed here of a plastic which insulates against high voltage.

In order to connect the energy storage module 12 to the cooling element 14, in a first variant the contact side 22 of the cooling element 14 is first cleaned in order to remove chemical and mechanical contaminants. The high-voltage protective film 26, which is designed here to be adhesive on one side, is then adhesively bonded onto the contact side 22 of the cooling element 14. Subsequently, the upper side of the high-voltage protective film 26 is cleaned and activated in a plasma process in order to improve the adhesion of the heat-conducting adhesive 28. Heat-conducting adhesive 28 is then applied in a certain thickness in a predetermined pattern, here in a zigzag pattern. The cooling element 14 prepared in such a manner is illustrated in FIG. 2.

The cooling element 14 is now inserted in a pressing apparatus (not illustrated specifically) in which a positioning device (not illustrated) with two positioning pins is provided. The positioning pins reach through two openings 30, 32 arranged in the vicinity of the two end sides of the cooling element 14. The opening 30, on the right in FIG. 2, is designed as a round hole with a precise fit for the positioning pin while the opening 32 which is shown on the left in FIG.

2 is designed as an elongated hole in order to be able to compensate for length tolerances in the cooling element 14.

In a variant (not illustrated), energy storage module 12 and cooling element 14 have centering structures, for example in the form of a tongue and groove connection, which result in self-centering when the two components are joined together.

The shape of the supporting surface of the pressing apparatus, on which the lower side 34 of the cooling element 14 is placed, is configured in a complementary manner to the shape of the lower side 34 of the cooling element 14 in order to supply as good a surface fit as possible (not shown).

In a next step, the energy storage module 12 is then likewise inserted into the pressing apparatus. The latter has a second positioning device (not illustrated) which, for example, contains two positioning pins which engage in openings in the energy storage module and position the latter relative to the cooling element 14. The positioning openings in the energy storage module 12 can be provided in a frame (not illustrated) which holds together the individual cells of the energy storage module 12, as is conventionally known. It is possible for the positioning openings of the energy storage module 12 to coincide with those of the cooling element 14, but this is not absolutely required.

Energy storage module 12 and cooling element 14 are now pressed together, with the pressing apparatus exerting a predetermined pressing force for a predetermined time. Owing to the pressing force, the heat-conducting adhesive 28 which is applied in the zigzag pattern is distributed over the entire contact side 20 of the energy storage module 12 and covers the entire surface of the high-voltage protective film 26. The zigzag-shaped application ensures that the air between the two components is pressed laterally outward such that no air locks form.

Tolerances between the surfaces of the contact sides 20, 22 of the energy storage module 12 and of the cooling element 14 are automatically compensated for by a corresponding distribution of the heat-conducting adhesive 28 during the pressing.

The pressing apparatus, for example, monitors the pressing operation in such a manner that, after the pressing operation is finished, the heat-conducting adhesive 28 has a predetermined second thickness which is also of such a size that the high-voltage protective film 26 is covered on each side by heat-conducting adhesive 28. The layer thickness is selected here in such a manner that damage to the high-voltage protective film 26 is prevented during the subsequent operation.

A sufficient thickness of the adhesive layer can also be ensured by using spacers which limit the displacement in the pressing direction, or by setting a suitable pressing force.

After the pressing has ended and the heat-conducting adhesive 28 has possibly partially hardened, the assembly 10 is removed from the pressing apparatus, wherein the energy storage module 12 is now connected fixedly and permanently to the cooling element 14 via the adhesive connection.

The assembly 10 can then be installed, for example, in a larger constructional unit with further energy storage modules 12 or can be inserted into a vehicle. In this example, the frame surrounding the cells of the energy storage module 12 is used for the fastening.

In order to interchange an assembly 10, the latter is removed together with the mounting frame from the vehicle and a new assembly 10 is fitted.

FIGS. 3 to 10 show various embodiments of the above-described assembly 10, in which the heat-conducting layer 24 is configured differently in each case. For clarity reasons, the same reference sign 24 is nevertheless always retained for the heat-conducting layer.

Figure 3:
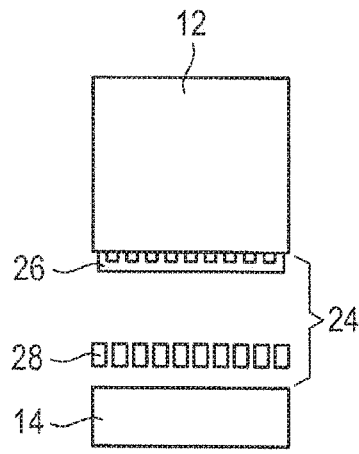
FIG. 3 is a schematic view of an assembly embodiment according to the invention with a differing design of a heat-conducting layer.

FIG. 3 shows a variant in which the heat-conducting adhesive 28 is applied to the cooling element 14 while the high-voltage protective film 26 is adhesively bonded onto the contact side 20 of the energy storage module 12. This variant is advantageous if, as a consequence of structural, manufacturing- or rigidity-induced circumstances, the contact side 22 of the cooling element 14 cannot be of flat design and therefore the unevennesses in the contact surface 22 can be compensated for by a thick layer of the heat-conducting adhesive 28. In this case, it is advantageous if the individual battery cells of the energy storage module 12 are aligned on the heat removal side thereof, which side forms the contact side 20, in order to configure the contact side 20 to be as flat as possible.

In a possible modification of this method, the heat-conducting adhesive 28 is applied and spread to form a smooth surface and is then entirely or partially hardened. In this case, use is preferably made of a high-voltage protective film 26 which is adhesive on both sides in order to complete the adhesive connection (not illustrated specifically).

Figure 4:
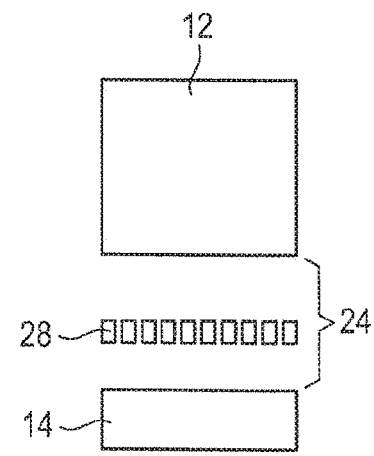
FIG. 4 is a schematic view of an assembly embodiment according to the invention with a differing design of a heat-conducting layer.

In the event of use of a corresponding suitable heat-conducting adhesive 28 which is applied in a sufficiently thick layer to the cooling element 14 or to the energy storage module 12, the use of an additional high-voltage protective film can be dispensed with. The heat-conducting layer 24 then consists exclusively of the heat-conducting adhesive 28. This is illustrated in FIG. 4.

Figure 5:
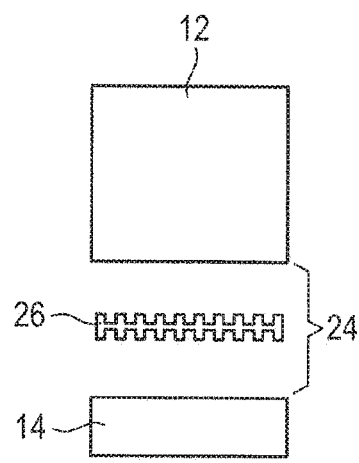
FIG. 5 is a schematic view of an assembly embodiment according to the invention with a differing design of a heat-conducting layer.

Conversely, it is also possible, in the event of use of a high-voltage protective film 26 which is suitable for compensating for unevennesses in the contact sides 20, 22, to form the heat-conducting layer 24 only of the high-voltage protective film 26 and to omit the use of an additional heat-conducting adhesive. In this case, the high-voltage protective film 26 is then designed to be adhesive on both sides in order to produce the adhesive connection between energy storage module 12 and cooling element 14. This is shown in FIG. 5. It is appropriate here to align the cells of the energy storage module 12 on the contact side 20.

Figure 6:
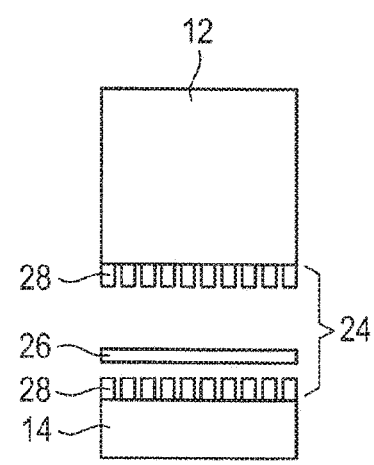
FIG. 6 is a schematic view of an assembly embodiment according to the invention with a differing design of a heat-conducting layer.

It is also possible first of all to apply a layer of the heat-conducting adhesive 28 to the contact sides 20, 22 of the energy storage module 12 and of the cooling element 14 in order to compensate for surface unevennesses and then to entirely or partially harden this layer. A high-voltage protective film 26 is then placed between the layers of the heat-conducting adhesive 28. Use can be made either of a high-voltage protective film 26 which is adhesive on two sides, or the heat-conducting adhesive 28 can be cured only to the extent that although the latter is already substantially dimensionally stable, it is still readily adhesive. An adhesive action of the high-voltage protective film 26 can then be omitted. This is illustrated in FIG. 6.

Figure 7:
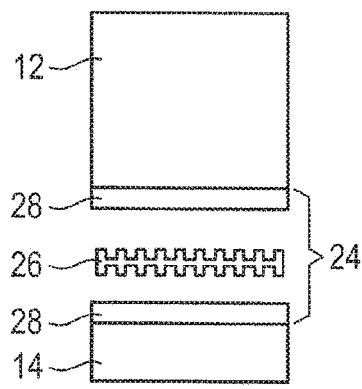
FIG. 7 is a schematic view of an assembly embodiment according to the invention with a differing design of a heat-conducting layer.

FIG. 7 shows a variant in which a layer of the entirely or partially hardened heat-conducting adhesive 28 is applied both on the contact side 20 of the energy storage module 12 and on the contact side 22 of the cooling element 14 and a high-voltage protective film 26 which is adhesive on both sides is arranged between the adhesive layers.

Figure 8:
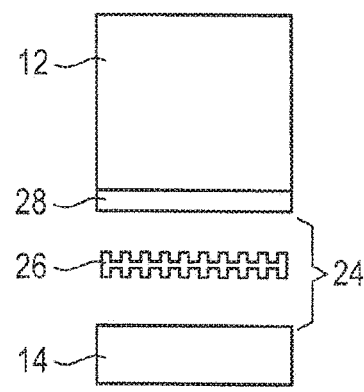
FIG. 8 is a schematic view of an assembly embodiment according to the invention with a differing design of a heat-conducting layer.
Figure 9:
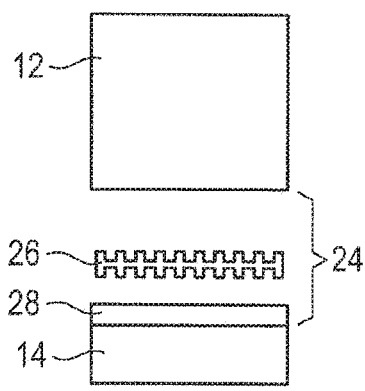
FIG. 9 is a schematic view of an assembly embodiment according to the invention with a differing design of a heat-conducting layer.

FIG. 8 shows a version in which a layer of an entirely or partially hardened heat-conducting adhesive 28 is provided only on the contact side 20 of the energy storage module 12, while a high-voltage protective film 26 which is adhesive on two sides is adhesively bonded to the contact side 22 of the cooling element 14. FIG. 9 shows a version the other way around, in which the high-voltage protective film 26 which is adhesive on two sides is adhesively bonded to the energy storage module 12 and the entirely or partially hardened layer of the heat-conducting adhesive 28 is applied to the cooling element 14.

Figure 10:
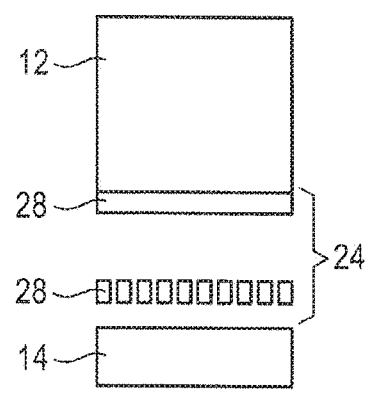
FIG. 10 is a schematic view of an assembly embodiment according to the invention with a differing design of a heat-conducting layer.
Figure 11:
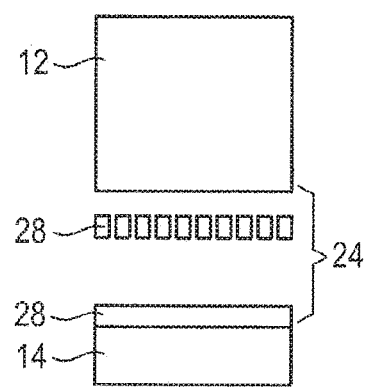
FIG. 11 is a schematic view of an assembly embodiment according to the invention with a differing design of a heat-conducting layer.

The variants shown in FIGS. 10 and 11 each combine an entirely or partially hardened layer of heat-conducting adhesive 28 either on the contact side 22 of the cooling element 14 or in the contact side 20 of the energy storage module 12 (FIGS. 10 and 11) with a still deformable, non-hardened layer of the heat-conducting adhesive 28 on the other component in each case. Unevennesses either in the contact side 20 of the cooling element 14 or in the contact side 22 of the energy storage module 12, for example due to tolerances of individual battery cells thereof, are also compensated for here by the additional adhesive layer. In addition, a defined thickness of the adhesive layer, which is associated with a predetermined puncture strength, is thus ensured. It is possible, after the application and hardening of the heat-conducting adhesive 28, to check the puncture strength before further working steps and optionally to correct the thickness of the adhesive layer.

In these examples, an additional high-voltage protective film 26 has been omitted, but this could optionally also be provided.

Further modifications of the described methods are, of course, also possible at the discretion of the person skilled in the art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing an assembly for an energy storage system having an energy storage module containing a plurality of individual battery cells and a plate-shaped cooling element adjacent to a contact side of the energy storage module which is parallel to a longitudinal axis of a stack of the plurality of individual battery cells, the method comprising the acts of:
    applying a deformable adhesive heat-conducting layer in contact with the contact side of the energy storage module and a contact side of the cooling element, wherein
        the heat-conducting layer includes a continuous high-voltage protective film and at least one continuous layer of a heat-conducting adhesive or a heat-conducting casting compound, and the heat-conducting adhesive or heat-conducting casting compound layers are
            applied to the contact sides of the energy storage module and the cooling element and are partially cured to such an extent that the heat-conducting layer is dimensionally stable but still adhesive, with the continuous high-voltage protective film being located between the layers, or
            applied to the contact sides of the energy storage module and the cooling element and are completely cured, with the continuous high-voltage protective film being adhesive on both sides and located between the layers, or
            applied only to the contact side of the energy storage module and completely cured, with the continuous high-voltage protective film being adhesive on both sides and located on the contact side of the cooling element, or
            applied only to the contact side of the cooling element and completely cured, with the continuous high-voltage protective film being adhesive on both sides and located on the contact side of the energy storage module, or
            applied to the contact side of the energy storage module or the cooling element in a completely cured form and applied to the contact side of the other of the energy storage module or the cooling element in a partially cured form, with the continuous high-voltage protective film being located between the layers;
    applying a pressing force to the energy storage module and pressing together the energy storage module and the cooling element for a predetermined pressing time at a predetermined pressing force, and
    removing the predetermined pressing force from the energy storage module and the cooling element,
    wherein
        the heat-conducting layer produces a dimensionally stable adhesive connection between the energy storage module and the cooling element, the dimensionally stable adhesive connection permanently connecting the energy storage module to the cooling element such that a further pressing force is not required when the energy storage module and the cooling element are in an installed position in a mounting frame, and
        a surface on a side of the cooling element opposite the contact side is not covered by support structure of the energy storage module.

2. The method according to claim 1, further comprising the act of:
    inserting the assembly comprising the energy storage module and the cooling element into the mounting frame.

3. The method according to claim 1, wherein:
    during the pressing act, a reduction in thickness of the deformable adhesive heat-conducting layer is limited, such that the dimensionally stable adhesive connection has a predefined thickness after the pressing act.

4. The method according to claim 1, wherein
    a surface of the high-voltage protective film is cleaned and/or activated.

5. The method according to claim 1, wherein:
    the cooling element is placed into a pressing apparatus and is fixed in the pressing apparatus in a predefined position via a positioning device, and
    the positioning device has a supporting surface corresponding to a negative shape of that surface of the cooling element resting thereon.

6. An assembly, comprising:
    an energy storage module containing a plurality of individual battery cells;
    a plate-shaped cooling element adjacent to a contact side of the energy storage module which is parallel to a longitudinal axis of a stack of the plurality of individual battery cells;
    a deformable adhesive heat-conducting layer applied in contact with the contact side of the energy storage module and a contact side of the cooling element by pressing for a predetermined pressing time at a predetermined pressing force,
    wherein the heat-conducting layer includes a continuous high-voltage protective film and at least one continuous layer of a heat-conducting adhesive or a heat-conducting casting compound, and the heat-conducting adhesive or heat-conducting casting compound layers are
- applied to the contact sides of the energy storage module and the cooling element and are partially cured to such an extent that the heat-conducting layer is dimensionally stable but still adhesive, with the continuous high-voltage protective film being located between the layers, or
- applied to the contact sides of the energy storage module and the cooling element and are completely cured, with the continuous high-voltage protective film being adhesive on both sides and located between the layers, or
- applied only to the contact side of the energy storage module and completely cured, with the continuous high-voltage protective film being adhesive on both sides and located on the contact side of the cooling element, or
- applied only to the contact side of the cooling element and completely cured, with the continuous high-voltage protective film being adhesive on both sides and located on the contact side of the energy storage module, or
- applied to the contact side of the energy storage module or the cooling element in a completely cured form and applied to the contact side of the other of the energy storage module or the cooling element in a partially cured form, with the continuous high-voltage protective film being located between the layers;

the heat-conducting layer provides a flat, materially bonded, permanently and dimensionally stable adhesive connection such that after removal of the predetermined pressing force the energy storage module and the cooling unit form a constructional unit that does not require a further pressing force when the energy storage module and the cooling element are in an installed position in a mounting frame, and a surface on a side of the cooling element opposite the contact side is not covered by support structure of the energy storage module.

\* \* \* \* \*